No. 756,798.

Patented April 5, 1904.

UNITED STATES PATENT OFFICE.

THEODORE S. PIERCE, OF DETROIT, MICHIGAN.

PROCESS OF MAKING PAVING-BRICK.

SPECIFICATION forming part of Letters Patent No. 756,798, dated April 5, 1904.

Application filed February 8, 1904. Serial No. 192,696. (No specimens.)

*To all whom it may concern:*

Be it known that I, THEODORE S. PIERCE, a citizen of the United States of America, residing at Detroit, in the county of Wayne and State of Michigan, have invented certain new and useful Improvements in Processes of Making Paving-Brick, of which the following is a specification, reference being had therein to the accompanying drawings.

This invention relates to certain improvements in a compound for paving-bricks, and has for its object the utilization of slag from smelting works, especially that produced in the reduction of silver and gold bearing ores found in the State of Washington and other western States, and which consists of a metalliferous mixture of silicates of the lower oxids of the heavier metals and is of a vitreous nature, very hard, dense, and of high specific gravity and forms an excellent material for making into paving-brick by compounding the same with cement and other ingredients, as hereinafter specified, into a plastic mass, molding the same into brick, and then subjecting the same to a further treatment, all as more fully hereinafter described.

In the process hereinafter described I use slag of the kind described after it has become thoroughly weathered for a season or two, whereby its physical condition makes it better adapted to be reduced into a granular mass by crushing, which is the first step in the process. The crushed slag should have the consistency of that of very coarse sand, with fine and coarse particles about evenly mixed, such as demanded for a good quality of sand for making coarse mortar. This crushed slag is then mixed with Portland cement in the proportion of about eight parts of slag to one of cement. Great care must be taken, however, before mixing to see that the slag is free from all moisture, and the mixture should be used at once. If the Portland cement contains no free lime, I also add a very small quantity of air-slaked lime, less than one-half that of cement. I also keep on hand two solutions, which are kept in separate vessels and prepared as follows: Solution No. 1 contains silicate of soda, sal-ammoniac, and green vitriol, the proportion being about forty-two gallons of water, twelve pounds of silicate of soda, three pounds of sal-ammoniac, and one pound of green vitriol. Solution No. 2 is made by mixing with about the same quantity of water two pounds of commercial muriatic acid and one pound of hydrofluoric acid. These solutions are kept separate in barrels ready for use. With these solutions I convert the dry mixture of slag and cement already prepared into a plastic compound by feeding into a suitable mixing-machine and adding enough of solution No. 1 to moisten the mixture thoroughly and convert it into a stiff mortar. Then I add enough of the second solution to obtain the proper consistency for molding. In this way I calculate to use about twelve parts, by measure, of the former to one part of the latter solution. The mixing must be performed very expeditiously, and as soon as the plastic condition for molding is reached the composition is at once molded and pressed into brick of the desired size and form. The bricks are then air-dried till they are in a condition to absorb moisture and are then subjected to an after treatment or curing process, which consists in placing them in a drying chamber or kiln and subjecting them to the hot products from open charcoal fires for the space of three or four days. At the same time while in the kiln they are repeatedly sprayed with the solution No. 1 until the brick becomes non-absorbent. The bricks are then ready for use, but may be dipped when taken out of the kiln into hot gas-tar.

The curing process is an essential part of the process, as it not only hastens the hardening, but induces certain chemical reactions to take place in which the formation of ferric oxid and its combination with the sal-ammoniac plays an important role in forming a cementitious compound, which greatly increases the hardness of the brick and makes it non-absorbent.

Having thus fully described my invention, what I claim is—

The herein-described process of making paving-brick, which consists in first mixing crushed slag and cement in about the proportions described, thence converting the same to a plastic condition by adding first a solution containing silicate of soda, sal-ammoniac and green vitriol dissolved in water in about the proportions described and thence adding a second solution containing hydrofluoric and muriatic acid diluted with water in about the proportions described, then molding the compound into brick, then air-drying the brick and finally curing the brick by subjecting it to the hot products from burning charcoal and simultaneously spraying it with the first-named solution.

In testimony whereof I affix my signature in presence of two witnesses.

THEODORE S. PIERCE.

Witnesses:
OTTO F. BARTHEL,
THOMAS G. LONGSTAFF.